(12) United States Patent
Martensson et al.

(10) Patent No.: US 9,222,604 B2
(45) Date of Patent: Dec. 29, 2015

(54) SEAL DEVICE FOR CONDUIT IN A FUEL DISPENSING UNIT

(71) Applicant: Wayne Fueling Systems Sweden AB, Malmo (SE)

(72) Inventors: Mattias G. Martensson, Kavlinge (SE); Bengt I. Larsson, Tingarod (SE)

(73) Assignee: Wayne Fueling Systems Sweden AB, Malmo (SE)

( * ) Notice: Subject to any disclaimer, the term of this patent is extended or adjusted under 35 U.S.C. 154(b) by 222 days.

(21) Appl. No.: 13/730,014

(22) Filed: Dec. 28, 2012

(65) Prior Publication Data

US 2014/0097577 A1 Apr. 10, 2014

Related U.S. Application Data

(60) Provisional application No. 61/710,329, filed on Oct. 5, 2012.

(51) Int. Cl.
*H02G 3/18* (2006.01)
*F16L 5/10* (2006.01)
*H02G 3/22* (2006.01)

(52) U.S. Cl.
CPC ... *F16L 5/10* (2013.01); *H02G 3/22* (2013.01)

(58) Field of Classification Search
CPC .......... F16L 5/02; H05K 5/0247; H02G 3/22
USPC ................. 277/602, 606; 222/14; 174/152 G; 174/153 G; 16/2.1
See application file for complete search history.

(56) References Cited

U.S. PATENT DOCUMENTS

| | | | | |
|---|---|---|---|---|
| 3,566,928 A * | 3/1971 | Hansel | | 141/97 |
| 4,883,103 A * | 11/1989 | Szlaga et al. | | 141/368 |
| 5,271,438 A * | 12/1993 | Griffin et al. | | 141/59 |
| 5,717,564 A | 2/1998 | Lindale | | |
| 5,730,194 A * | 3/1998 | Foltz | | 141/301 |
| 8,196,934 B2 * | 6/2012 | Do | | 277/580 |
| 2008/0164658 A1 * | 7/2008 | Do | | 277/355 |
| 2013/0074986 A1 * | 3/2013 | Larsson et al. | | 141/311 R |
| 2014/0232106 A1 * | 8/2014 | Mukai et al. | | 285/194 |

FOREIGN PATENT DOCUMENTS

| WO | WO-2012022379 | 2/2012 |
|---|---|---|
| WO | WO-2012103922 | 8/2012 |

* cited by examiner

*Primary Examiner* — Gilbert Lee

(57) ABSTRACT

Embodiments of seal device prevent migration of vapor into compartments that house electronics in a fuel dispensing unit. These embodiments deploy about conduits in a vapor barrier to seal gaps between the conduit and opening in plates of the vapor barrier and/or other components that separate the electronics from fuel-handing components. In one or more embodiments, the sealing device forms a radial seal about the conduit and a planar seal with the vapor barrier, where the sealing device is configured to maintain the planar seal and to allow relative movement of the conduit with respect to the vapor barrier in the opening. This relative movement can occur as a result of connection of the conduit to the fuel-handling components, e.g., a motor that can change position due to operation and/or natural settling of the support structure that supports the motor in the dispensing unit.

20 Claims, 8 Drawing Sheets

SEAL DEVICE FOR CONDUIT IN A FUEL DISPENSING UNIT

CROSS-REFERENCE TO RELATED APPLICATIONS

This application claims the benefit of priority to U.S. Provisional Patent Application Ser. No. 61/710,329, filed on Oct. 5, 2012 and entitled "Conduit Sealing in Fuel Dispensing System," the content of which is incorporated in its entirety herein.

BACKGROUND

The subject matter disclosed herein relates to fuel dispensing systems and, in particular, to embodiments of a sealing device to prevent exposure of electronics to fuel vapors in fuel dispensing systems.

Fuel dispensing systems transfer fluid (e.g., gasoline, diesel, etc.) from storage tanks to receptacles (e.g., a fuel can and/or a fuel tank on a vehicle). These systems include a dispensing unit that incorporates, in some examples, nozzles, grade selectors, and payment components that allow consumers to complete transactions at the dispensing unit. The dispensing unit also includes various types and configurations of electronics to facilitate operation of these various devices and features. However, these electronics are often susceptible to damage from, if not wholly incompatible with, vapors that are the by-product of the fluids that flow through the dispensing system.

Designs for the dispensing unit attempt to avoid exposing the electronics to the vapors. These designs often use separate compartments to segregate the electronics from any fuel-handling components (e.g., meters, pumps, etc.). In many cases, however, the electronics must communicate with one or more of the fuel-handling components. This requirement necessitates openings that permit wiring to penetrate through the walls that form the compartments, e.g., to couple a flow meter in one compartment to a control circuit in another compartment. Typically the openings are large enough to accommodate the wiring and, in some examples, to allow conduits (e.g., tubing) that insert into the opening. The conduits provide a pathway for the wiring between the various components.

Wiring that extends through the compartmentalized construction can permit vapors to migrate through the openings and conduits into the electronics compartment. As dispensing units add new features and functions, more wires and, accordingly, more openings are necessary. The structure that results is, in effect, very porous to vapor. Moreover, the porosity is made worse due to tolerance stack-ups and other manufacturing considerations that require openings that are larger than the wires and/or conduits.

To address the effective porosity, dispenser units incorporate seals that install about the outer surfaces of the wires and/or conduits. These seals are in place to prevent vapors from migrating into the electronics compartment through gaps between the outer surface of the conduit and the inner surface of the openings.

BRIEF DESCRIPTION OF THE INVENTION

This disclosure describes improvements to the vapor barrier to prevent migration of vapor into compartments that house electronics. These improvements focus on devices that deploy about the conduits to seal gaps between the conduit and opening in plates of the vapor barrier and/or compartment walls. In one or more embodiments, the proposed design allows movement of the conduit in the opening. This movement can occur as a result of connection of the conduit to a fuel-handling component, e.g., a motor that can change position due to operation and/or natural settling of the support structure that supports the motor in the dispensing unit.

BRIEF DESCRIPTION OF THE DRAWINGS

Reference is now made briefly to the accompanying Appendix, in which.

Where applicable like reference characters designate identical or corresponding components and units throughout the several views, which are not to scale unless otherwise indicated.

DETAILED DESCRIPTION

Figure 1:
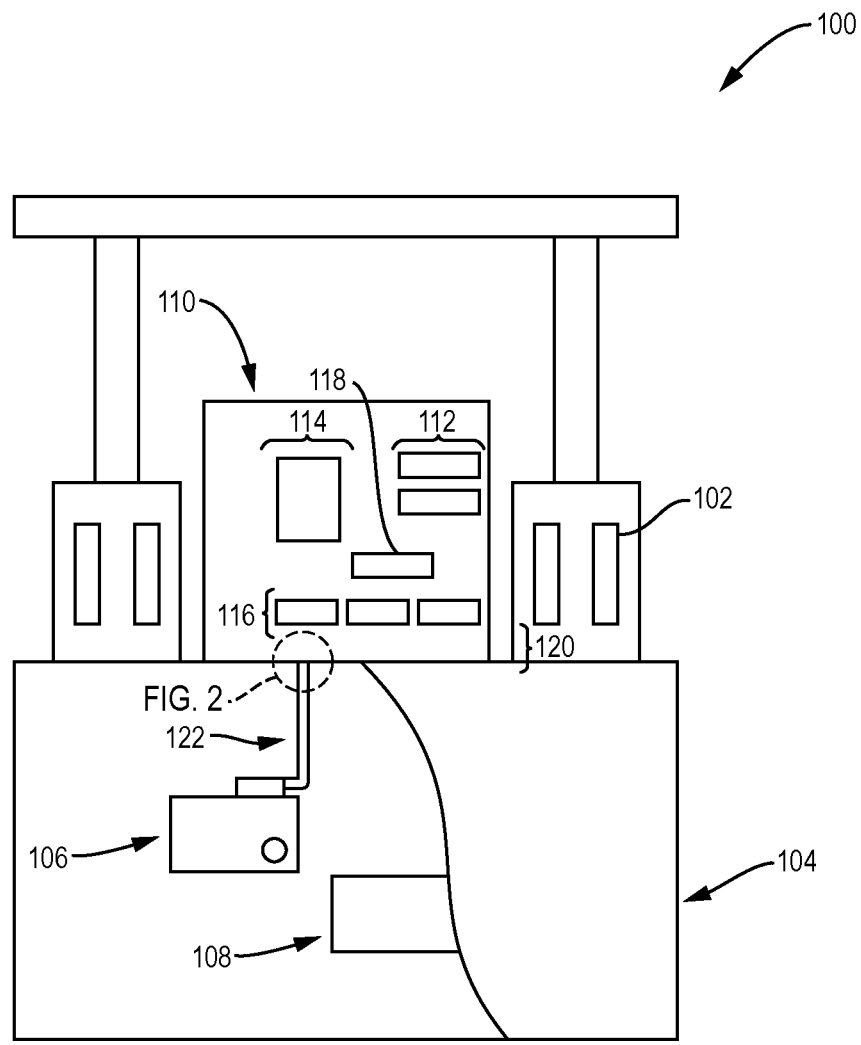
FIG. 1 depicts a schematic view of an exemplary embodiment of a dispensing unit.

FIG. 1 illustrates a partial cross-section of an exemplary dispensing unit 100 that finds use in a dispensing system, e.g., at a gas station. The dispensing unit 100 has nozzles 102 that end users can use to dispense fuel, e.g., into a vehicle. The dispensing unit 100 also has a compartmentalized structure with a lower compartment 104 that houses one or more fuel-handling components (e.g., a first fuel-handling component 106 and a second fuel-handling component 108). Examples of the fuel-handling components 106, 108 include meters and pumps. An upper compartment 110 resides above the lower compartment 104. The upper compartment 110 can include various elements (e.g., a fuel gage element 112, a display 114, grade selecting elements 116, and a card processing element 118). In one example, the dispensing unit 100 also includes a vapor barrier 120 that permits wires to extend from components in the lower compartment 104 to components in the upper compartment 110. The vapor barrier 120 can include a conduit 122, which provide a protective pathway for the wires through the vapor barrier 120 and the walls of the compartments 104, 110. As shown in the example of FIG. 1, the conduit 122 may couple with one of the fuel-handling components 106, 108.

As set forth more below, the dispensing unit 100 can include one or more sealing devices that prevent vapors from migrating from the lower compartment 104 to the upper compartment 110. These sealing devices can secure about the periphery of the conduit 122. Moreover, in one example, the sealing devices can secure to components of the vapor barrier 120 to both prevent vapor migration as well as to accommodate for relative movement of the conduit 122 with respect to the components of the vapor barrier. The fuel-handling components 106, 108 may include this relative movement, which can translate, pivot, and/or cause the conduit to change position (e.g., from a first position to a second position) during and/or after operation of the respective fuel-handing component 106, 108. For example, pumps that move fuel through the fuel dispenser may induce vibration and/or slight re-orientation of the conduit 122 at start-up, during pumping operations, as well as when operation of the pump is terminated. Examples of the sealing devices the disclosure contemplates herein allow the conduit 122 to change position without compromising the vapor-resistant seal that the sealing device forms with the components of the vapor barrier 120 and the conduit 122.

Figure 2:
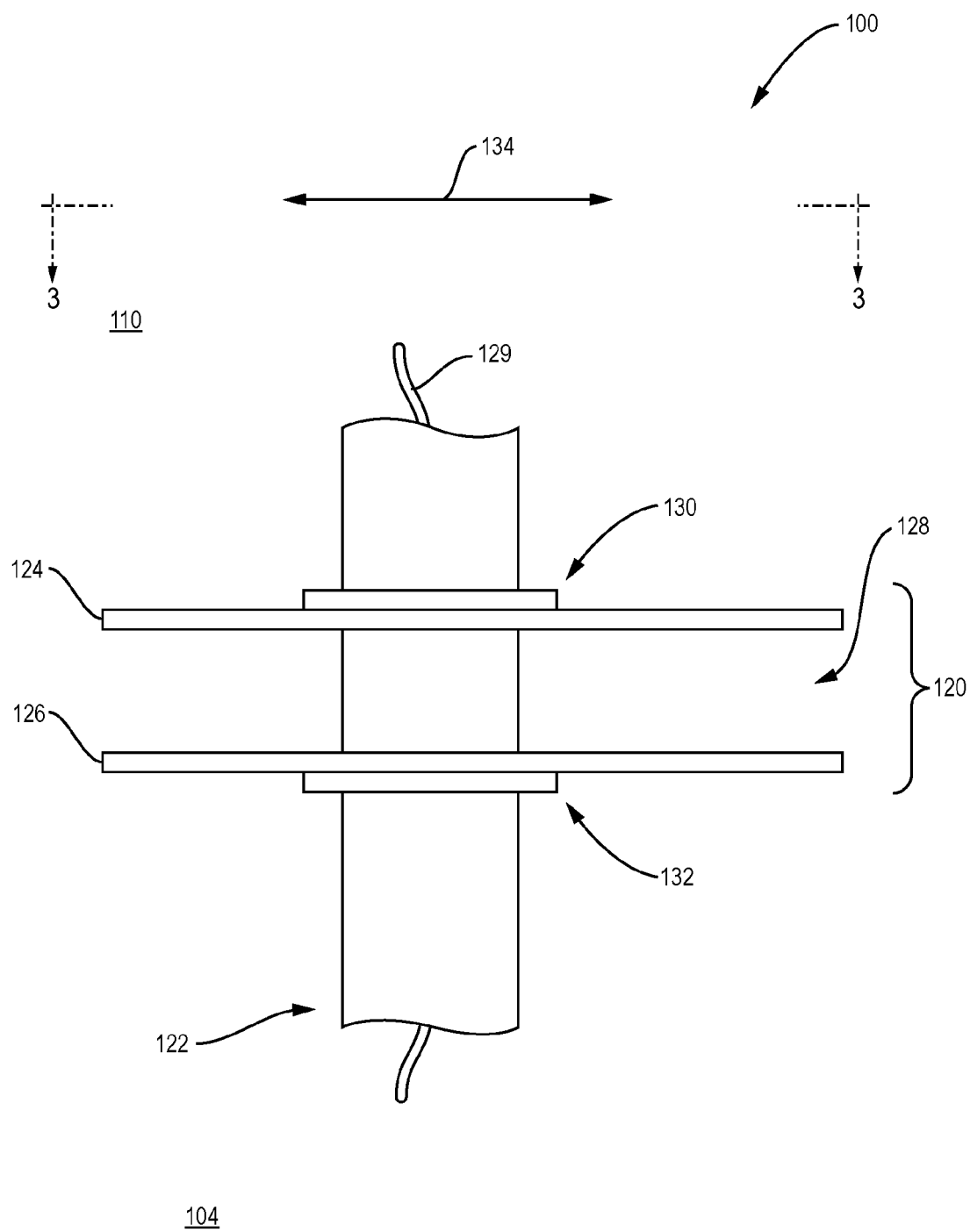
FIG. 2 depicts a detail view of the dispensing unit of FIG. 1 that includes an example of a sealing device in position on a vapor barrier.

FIG. 2 shows the detail view A (FIG. 1) of the dispensing unit 100 to focus the discussion on a proposed sealing configuration for the conduit 122. In the configuration of FIG. 2, the vapor barrier 120 can include one or more plates (e.g., a first plate 124 and a second plate 126) that are spaced apart to form an air gap 128. The conduit 122 penetrates through the plates 124, 126 to form a passageway for one or more wires 129 to pass from the lower compartment 104 to the upper compartment 110. In one embodiment, the dispensing unit 100 includes one or more sealing devices (e.g., a first sealing device 130 and a second sealing device 132). The sealing devices 130, 132 couple with the conduit 122 and with a surface of, respectively, the first plate 124 and the second plate 126. Examples of the sealing devices 130, 132 allow the conduit 122 to translate, e.g., as generally indicated by the arrow identified with the numeral 134. This feature accommodates relative movement of the conduit 122 with respect to one or both of the plates 124, 126 that can occur during operation of the fluid handling components 106, 108 (FIG. 1), while preventing vapor from migrating from the lower compartment 104 to the upper compartment 110 through openings in the plates 124, 126 as discussed more below.

Figure 3:
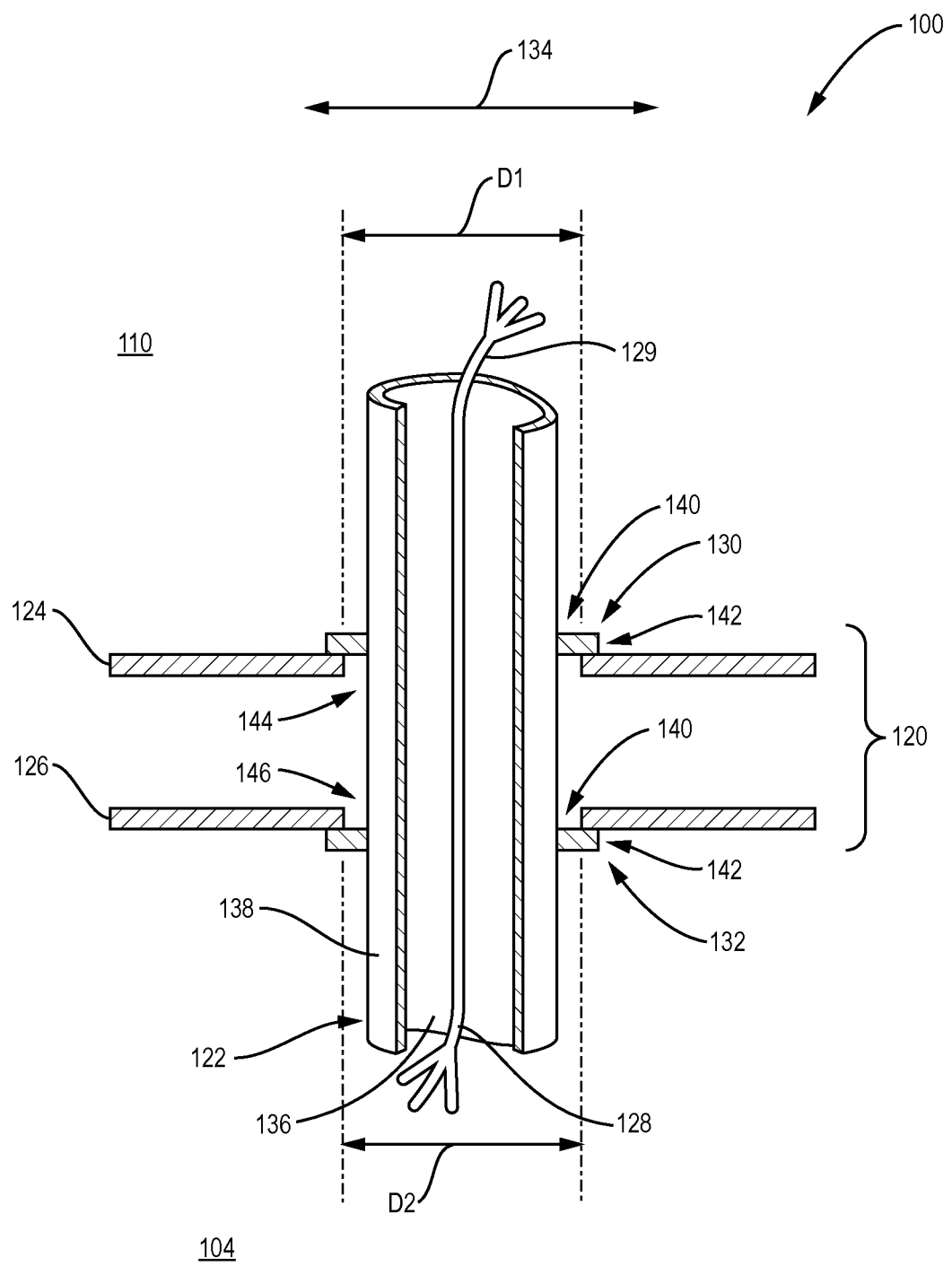
FIG. 3 depicts a cross-section of the dispensing unit of FIG. 2 taken at line 3-3.

As best shown in FIG. 3, which illustrates a cross-section of the vapor barrier 120 taken along line 3-3 in FIG. 2, the conduit 122 can have a tubular structure with an inner surface 136 and an outer surface 138. The sealing devices 130, 132 can create a radial seal 140 with the outer surface 138 of the conduit 122 and a planar seal 142 with the surface of the plates 124, 126. In one example, the first plate 124 and the second plate 126 can have openings (e.g., a first opening 144 and a second opening 146) that allow the conduit 122 to pass therethrough. The openings 144, 146 have dimensions (e.g., a first inner dimension D1 and a second inner dimension D2) that are generally larger than the outer dimension of the outer surface 138 of the conduit 122. These larger dimensions allow the conduit 122 to move among a plurality of positions within the openings 144, 146, including a first position and a second position that is different from the first position.

The radial seal 140 and the planar seal 142 can prevent vapors from migrating between the lower compartment 104 and the upper compartment 110, forming a seal that is adequate to prevent vapor migration as set forth in one or more standards, specifications, and/or government regulations as desired. In one embodiment, the seal devices 130, 132 can mate with the outer surface 138 of the conduit 122 to form the radial seal 140. For example, the seal devices 130, 132 can have an aperture that is sized and configured to fit about the outer surface 138. The dimensions of the aperture can define the fit, e.g., a tight slip fit and/or a press fit, between the seal devices 130, 132 and the outer surface 138. This fit can provide the seal devices 130, 132 with sufficient contact to the outer surface 138, e.g., to prevent migration of vapor in amounts that can damage electronics in the upper compartment 110. This fit can also allow the seal devices 130, 132 to slide longitudinally up and down the conduit 122, which can aid in assembly and fabrication of the dispensing unit 100. For example, during assembly, the conduit 122 can insert through the openings 144, 146 on the first plate 124 and the second plate 126 and the seal devices 130, 132 can be slid onto the conduit 122 to mate with the surface of the first plate 124 and the second plate 126.

Configurations of the fuel dispenser 100 may include one or both of the seal devices 130, 132. For example, the fuel dispenser 100 may include only the first seal device 130 in position on the first plate 124 or only the second seal device 132 in position on the second plate 126. In other examples, the fuel dispenser includes both the first seal device 130 and the second seal device 132. Use of the second seal device 132 is useful to accommodate for dimensions of the air gap 128, which are often too narrow to allow proper access for tools and/or fingers to hold and/or retain devices that would otherwise seal the conduit 122 at the second plate 126. As discussed herein, examples of the second seal device 132 couple with the second plate 126. This features secures the second seal device 132 in position, thus allowing assembly of the fuel dispenser 100 to continue without the need to hold the second seal device 132.

In other embodiments, the seal devices 130, 132 may further include a secondary seal element, e.g., a gasket and/or an o-ring. The secondary seal element can fit between the material of the seal devices 130, 132 and the outer surface 138 of the conduit 122. Examples of this secondary seal element can comprise compressible and/or partially compressible materials that conform to the surface of the aperture in the seal devices 130, 132 and the outer surface 138 of the conduit 122. These materials can help prevent vapor from migrating between the lower compartment 104 and the upper compartment 110.

Examples of the sealing devices 130, 132 can form the planar seal 142 with the plates 124, 126 using a coupling force that arises, e.g., via magnetic attraction and/or other releasable means. As set forth above, the coupling force secures the sealing devices 130, 132 to the plates 124, 126. This configuration prevents vapors, e.g., from migrating from the lower compartment 102 to the upper compartment 104. In one embodiment, the coupling force allows the sealing device 130, 132 to slide, or otherwise translate, while maintaining contact with the surface of the plates 124, 136. This feature allows the sealing device 130, 132 to maintain the planar seal 142 as the conduit 122 moves or floats, e.g., between the first position and the second position within the openings 144, 146. Floating accommodates for motion in the conduit 122 that can occur when components in the lower compartment 102 (FIG. 1) move and/or impart force onto the conduit 122. Floating can prevent damage to the conduit, which may comprise materials (e.g., plastics and composites) that exhibit relatively high values of mechanical stiffness. On the other hand, in the event that the conduit 122 exerts sufficient forces to overcome the coupling force and, consequently, break the planar seal 142, configurations of the sealing device 130, 132 can reattach to the surface of the plates 124, 126 without the need for intervention from a technician.

As shown in FIG. 3, in one example, the outer dimension of the sealing devices 130, 132 is larger than the maximum size of the openings 144, 146 in the plates 124, 126. This configuration overlaps the material of the sealing device 130, 132 with the openings 144, 146 to maintain the sealing device 130, 132 in contact with the plates 124, 126 as the conduit 122 moves, e.g., between a first position and a second position. The amount of overlap can be selected in accordance with the estimated amount of movement of the conduit 122 and/or with the size of the openings 144, 146. For example, the outer dimension of the sealing devices 130, 132 may have a value that is in the range of 10% to 20% larger than the inner dimensions D1, D2 of the openings 144, 146.

The sealing devices 130, 132 can assume a variety of form factors to accommodate different geometry (e.g., shapes and sizes) of the conduit 122 and the openings 144, 146. These form factors may have dimensions that are different as between the first opening 144 and the second opening 146, e.g., the second opening 146 is larger than the first opening 144, and vice versa. These form factors include circular, elliptical, square, and rectangular, however, this disclosure contemplates any shape and/or combination of shapes as necessary. In one example, one or both of the openings 144, 146 can have an oval and/or elliptical shape. The sealing devices 130, 132 can assume the relatively thin cross-section that is shown in FIG. 3. For example, the sealing devices 130, 132 can take the form a washer element, which can have a central aperture with an inner dimension that fits about the conduit 122 and an outer dimension that covers the openings 144, 146 as set forth herein. Exemplary materials for the sealing devices 130, 132 include metals and compositions of metals that can be magnetized. In non-magnetic applications, the material selection may depend on a type of fastening technique (e.g., releasable adhesive) that can apply the coupling force to secure the sealing devices 130, 132 to the plates 124, 126.

Figure 4:
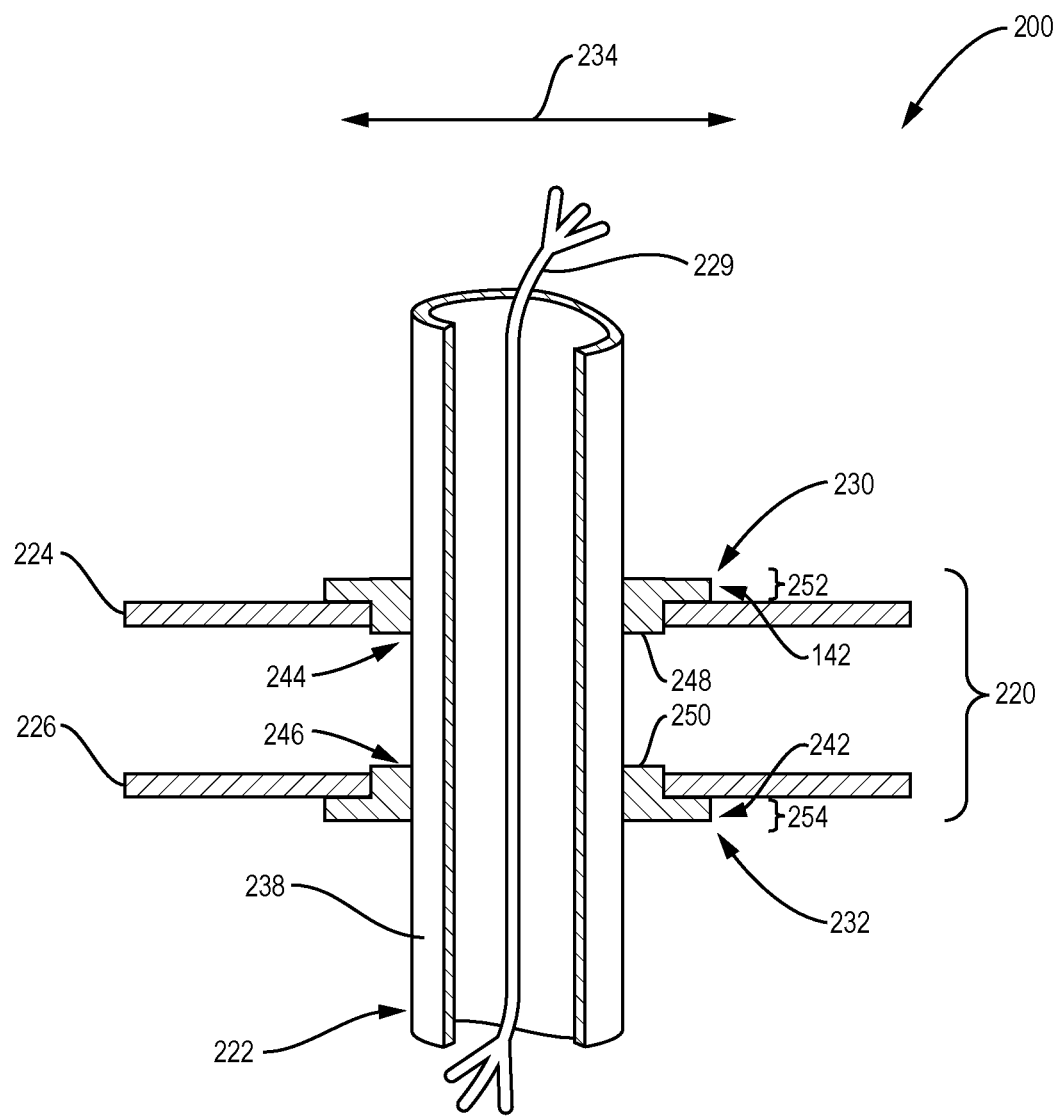
FIG. 4 depicts a cross-section of a dispensing unit that includes an example of a sealing device in position on a vapor barrier.

FIG. 4 illustrates a cross-section of another example of a vapor barrier 220 of a dispensing unit 200. The vapor barrier has a conduit 222 with an outer surface 238 that houses a wire 229. The conduit extends through openings 244, 246 in the plates 224, 226, the openings having a dimension to allow the conduit to translate 234. In this example, the sealing devices 230, 232 comprise boss members (e.g., a first boss member 248 and a second boss member 250) and flange members (e.g., a first flange member 252 and a second flange member 254). The boss members 248, 250 extend longitudinally along the axis of the conduit 220 and into the openings 244, 246. Dimensions for the boss members 248, 250 may be smaller than the dimensions D1, D2 of the openings 244, 246. This configuration permits the boss member 248, 250 to move and/or float within the openings (e.g., openings 140 of FIG. 3). In other examples, the boss member 248, 250 may be sized to form a press fit with the dimensions D1, D2 of the openings 244, 246. The resulting tight fit can act as the vapor-resistant seal.

The flange members 252, 254 can contact and/or couple with the surface of the plates 224, 226 using the coupling force to form the planar seal 242, if desired. Moreover, the material of the flange members 252, 254 can overlap with the first plate 224, 226 to maintain contact during movement of the conduit 222 as set forth herein. Examples of the seal devices 230, 232 can comprise compressible and/or pliable material(s), e.g., for use as the boss members 248, 250. These types of materials have properties that would permit movement of the conduit 222. For example, the boss member 248, 250 could compress to allow the conduit 222 to move from the first position to the second position in the openings 244, 246. In other examples, the flange members 252, 254 can form the washer element, discussed above, with the boss members 248, 250 secured to the washer element, e.g., separate components and/or as an integrally, unitary structure.

Figure 5:
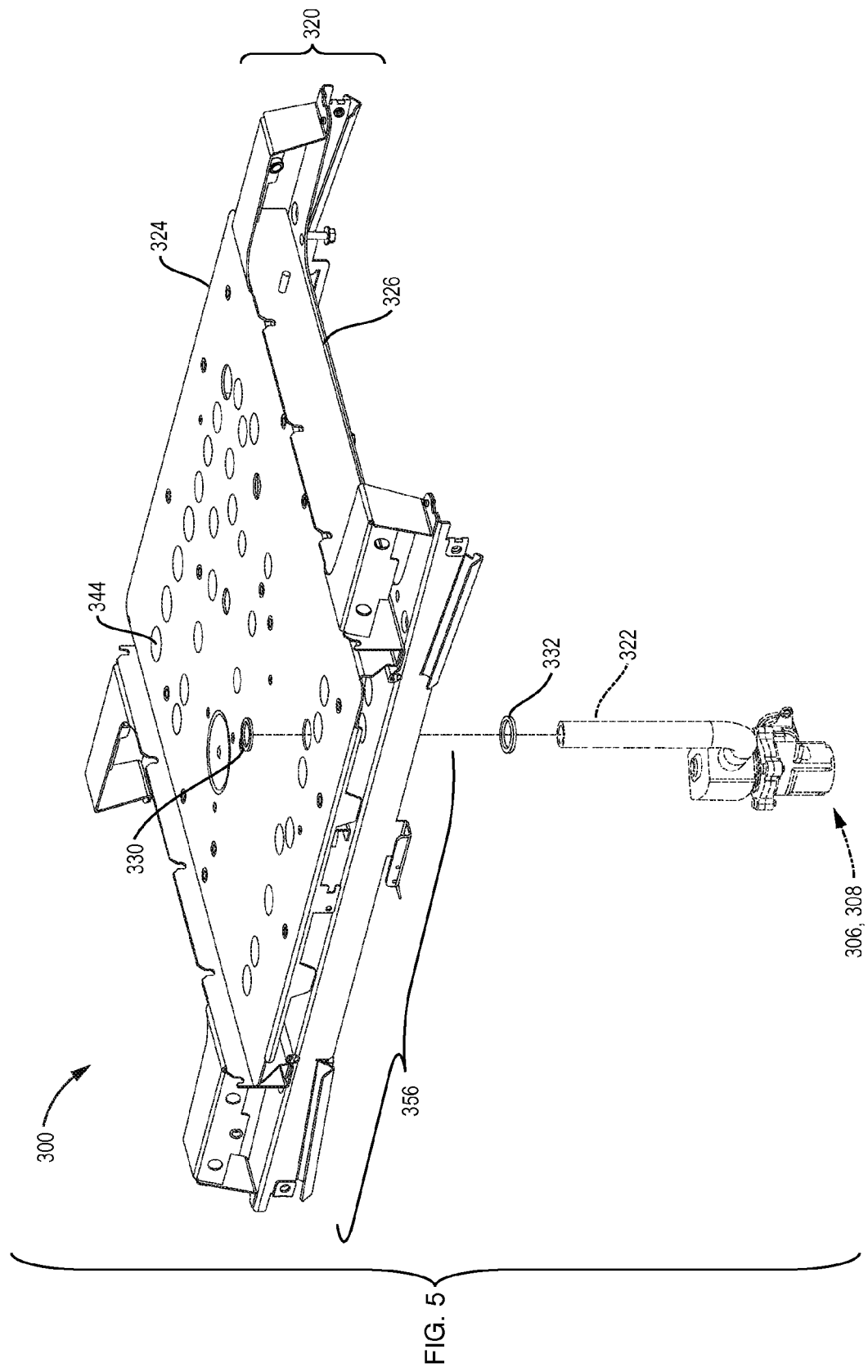
FIG. 5 depicts a perspective view of an exploded assembly of an exemplary embodiment of a dispensing unit with an example of a sealing device in position on a vapor barrier.

FIG. 5 shows a perspective view of an exploded assembly of an example of a vapor barrier 320 found in a dispensing unit 300. The first plate 324 (and also, in one example, the second plate 326) include an array 356 of openings (e.g., the first opening 344) that are dispersed about the surface area of the first plate 324. This disclosure contemplates various shapes for the openings 344 (and openings in the second plate 326) including circular, square, rectangular, elliptical, and the like. The features and form factors (e.g., size, shape, etc) of the sealing devices 330, 332 can be selected to accommodate these design variations.

During installation, the conduit 322 can insert into one of the openings 344. The conduit 322 can extend between the compartments (e.g., the first compartment 104 and the second compartment 110 of FIG. 1). In one example, the conduit 322 can secure to the fluid-handling component 306, 308. Wires thread and/or extend through the conduit 322, thus connecting the fluid-handling component 306, 308 with the respective electronics through the vapor barrier 320. As shown in FIG. 5, the array 356 can accommodate a number of conduits (e.g., the conduit 322) as necessary. Openings 344 in the array 356 that do not receive a conduit 322 can be sealed, e.g., using an example of the sealing devices 330, 320 that do not have the central aperture, but rather form a single, structure that can cover the opening 344 to prevent vapor from migrating through the vapor barrier 320.

Figure 6:
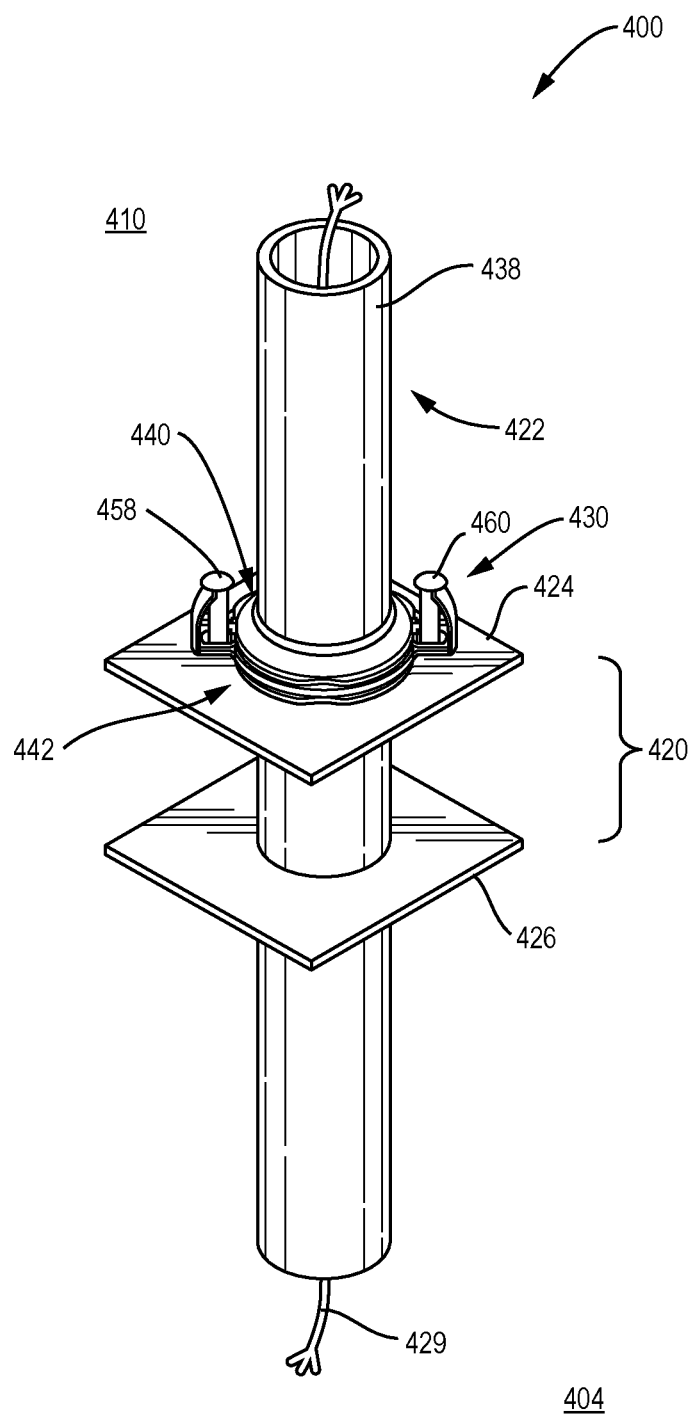
FIG. 6 depicts a perspective view of an exemplary embodiment of a dispensing unit with an example of a sealing device in position on a vapor barrier.

FIG. 6 illustrates a detail view of another example of a dispensing unit 400 with focus on the vapor barrier 420 that is disposed between a lower compartment 404 and an upper compartment 410 to allow a wire 429 to extend therebetween. The sealing device 430 engages one or more posts. As shown, the conduit 422 penetrates through the first plate 424 and the second plate 426. The sealing device 430 is in position proximate the first plate 424. In one example, the sealing device 430 engages one or more posts (e.g., a first post 458 and a second post 460). This engagement secures the sealing device 430 to ensure formation of the planar seal 442, although configurations of sealing devices 430 may allow some motion (e.g., lateral motion) to accommodate for changes in position of the conduit 422, e.g., between the first position and the second position, as discussed above.

Figure 7:
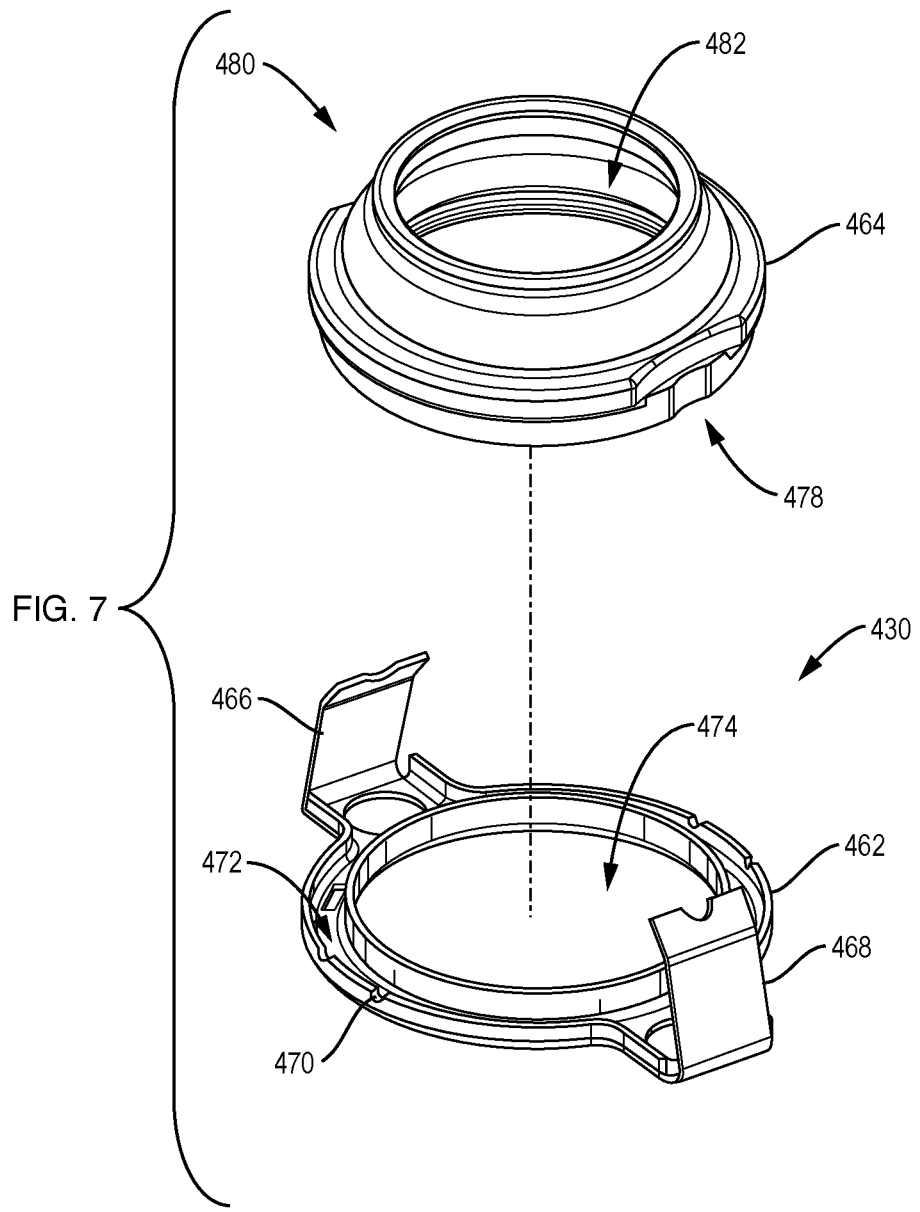
FIG. 7 depicts a perspective view of an exploded assembly of an example of a sealing device.

FIG. 7 shows the sealing device 430 in exploded assembly form. The sealing device 430 includes a frame member 462 and a sealing cylinder 464. The frame member 462 includes one or more arms (e.g., a first arm 466 and a second arm 468) and a circumferential body 470 that forms a groove 472 that circumscribe an aperture 474. The sealing cylinder 464 has a lower portion 478 and an upper portion 480. The lower portion 478 that can sit in the groove 472 when the sealing cylinder 464 is in position in the frame member 462. The upper portion 480 extends toward the arms 466, 468, forming an upper aperture 482.

The frame member 562 can comprise metals, e.g., spring steels, that provide the arms 466, 468 with some resiliency. The spring steel can be formed monolithically, wherein the arms 466, 468 are formed as a single unitary construction with the circumferential body 470. In other constructions, welds, adhesives, and other fastening elements and techniques may find use to secure construction, and otherwise form the various features of the frame member 562. In one embodiment, the frame member 562 has a flat and/or generally flat bottom that rests on the surface of the plates (e.g., plates 424, 426 of FIG. 6) to form the seal about the conduit (e.g., conduit 422 of FIG. 6). The resilient arms 466, 468 can provide a biasing force (aided by the position of the posts 458, 460 of FIG. 6) that further secures the bottom surface of the circumferential body 470 in contact with the surface of the plates (e.g., plates 424, 426 of FIG. 6).

The sealing cylinder 464 provides axial support longitudinally along the conduit (e.g., conduit 422 of FIG. 6). Opening 482 in the sealing cylinder 464 can fit about the conduit (e.g., conduit 422 of FIG. 6). These fits are, in one example, sufficient to form the radial seal (E.g., radial seal 440 of FIG. 6) between the inner surface of the sealing cylinder 464 and the conduit (e.g., on the outer surface 438 of FIG. 6). The resulting seal can help prevent vapor migration in the fuel dispenser 400. Exemplary materials for the sealing cylinder 464 are generally inert and/or non-reactive to fuel vapors. These materials include rubber and thermoplastic elastomer (TPE) and their derivations, as well as compositions and combinations thereof. In one embodiment, the sealing cylinder 464 has a surface that mates with the surface of the plates (e.g., plates 424, 426 of FIG. 6) to create the planar seal (e.g., planar seal 442 of FIG. 6).

Figure 8:
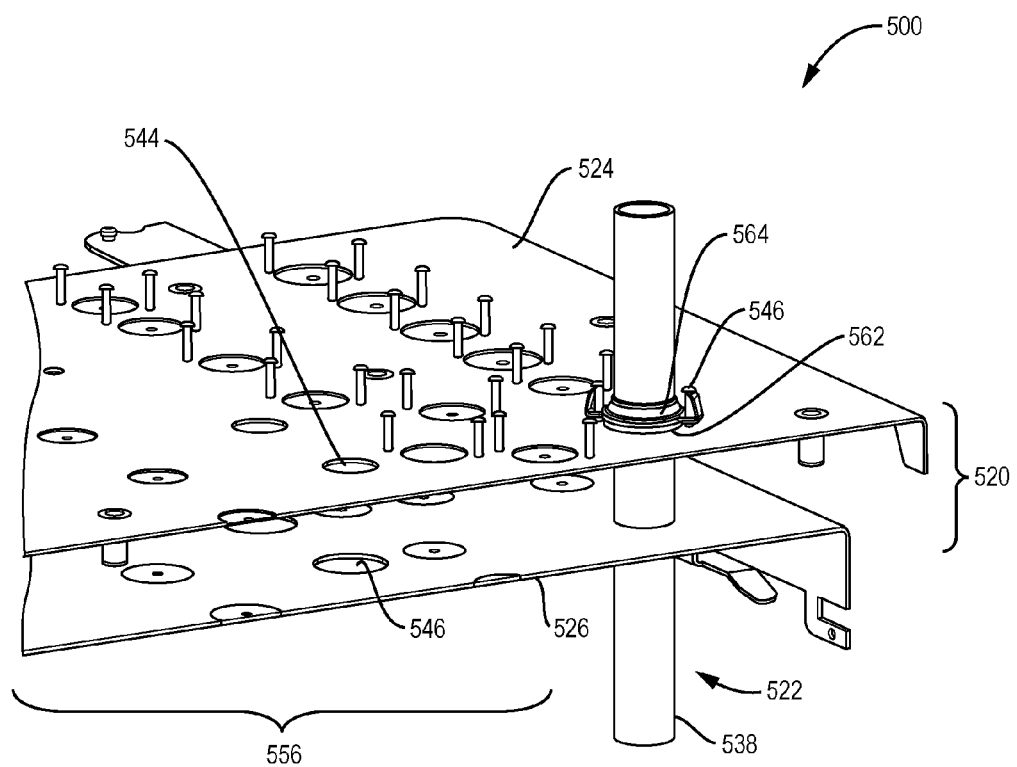
FIG. 8 depicts a perspective view an exemplary embodiment of a dispensing unit with an example of a sealing device in position on a vapor barrier.

FIG. 8 shows a perspective view of an exploded assembly of an example of a dispensing unit 500, with particular focus on the vapor barrier 520. The first plate 524 (and also, in one example, the second plate 526) include an array 556 of openings (e.g., the first opening 544 and the second openings 546) and posts (e.g., the first post 458 and the second post 460 of FIG. 6) that disperse about the surface area of the first plate 524. In one example, the sealing cylinder 564 fits about the conduit 522. The frame member 562 receives the sealing cylinder 564 and is disposed on the first plate 524. This configuration creates both a radial seal (e.g., radial seal 440 of FIG. 6) with the outer surface 538 of the conduit 522 and a planar seal (e.g., planar seal 442 of FIG. 6) with the surface of the plates 524.

In light of the foregoing discussion, embodiments of the dispensing units above utilize a sealing device that can form a vapor-resistant seal about conduits in a vapor barrier. The sealing devices is configured to allow movement of the conduit. This feature accommodates for movement of the conduit that components of the dispensing unit can induce, e.g., before, during, and after operation to dispense fuel. This movement can change the position of the conduit respect to components of the vapor barrier (e.g., fixed plates). However, use of the proposed sealing devices accommodate for the change in position of the conduit, while maintaining the seal that protects sensitive electronic components that operate the fluid-handling components and/or facilitate other operation of the dispensing units.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel dispensing unit, comprising:
   a first plate having a first opening;
   a conduit extending through the first opening, the conduit having a first position and a second position that is different than the first position in the first opening;
   a second plate in spaced relation to the first plate forming an air gap, the second plate having a second opening, wherein the conduit extends through the second opening; and
   a first seal device disposed against and sealed around the conduit and coupling with only the first plate, movement of the conduit causing the first seal device to translate along a surface of the first plate, the first seal device maintaining contact with the surface of the first plate in the first position and the second position of the conduit, wherein a wire extends through the conduit to connect a fuel-handling component to an electronic component.

2. The fuel dispensing unit of claim 1, wherein the first seal device emits a magnetic field that secures the first seal device to the first plate.

3. The fuel dispensing unit of claim 2, wherein the first seal device has an inner opening that circumscribes an outer surface of the conduit.

4. The fuel dispensing unit of claim 1, further comprising a second seal device coupling with the second plate.

5. The fuel dispensing unit of claim 1, wherein dimensions of the first opening are different from dimensions of the second opening.

6. The fuel dispensing unit of claim 1, wherein the first seal device comprises a flange member having an outer dimension that is larger than a maximum inner dimension of the first opening.

7. The fuel dispensing unit of claim 1, wherein the first seal device has an outer dimension that is greater than the maximum dimension of the first opening.

8. The fuel dispensing unit of claim 1, wherein the first plate has an inner surface facing the air gap and an outer surface opposite the inner surface, and the first seal device couples with the outer surface of the first plate.

9. A fuel dispensing unit, comprising:
   a vapor barrier comprising a conduit;
   a seal device disposed against and sealed around the conduit, the seal device forming a coupling force with a first plate of the vapor barrier to form a planar seal, movement of the conduit causing the seal device to translate along a planar surface of the first plate, wherein the coupling force maintains the planar seal between the seal device and the first plate in a first position and a second position of the conduit, wherein the first position is different from the second position;
   an upper compartment including an electronic component; and
   a lower compartment including a fuel-handling component, wherein the seal device is positioned between the upper compartment and the lower compartment, and the conduit extends from the upper compartment to the lower compartment.

10. The fuel dispensing unit of claim 9, wherein the coupling force magnetically couples the seal device with the first plate.

11. The fuel dispensing unit of claim 9, wherein the vapor barrier comprises a first opening and a second opening for receiving the conduit therein, and wherein the first opening has a first inner dimension and the second opening has a second inner dimension that is different from the first inner dimension.

12. The fuel dispensing unit of claim 11, wherein one of the first opening and the second opening comprises an oval shape.

13. The fuel dispensing unit of claim 9, wherein the seal device has an outer dimension that is greater than the maximum dimension of at least one of the first opening or the second opening.

14. The fuel dispensing unit of claim 9, further comprising a wire extending through the conduit to connect the electronic component to the fuel-handling component.

15. A fuel dispensing unit, comprising:
a vapor barrier comprising:
   a first plate having first openings forming a first array;
   a second plate having second openings forming a second array;
   a conduit disposed in one of the first openings and one of the second openings and extending through the first plate and the second plate; and
   a first seal device disposed against and forming a radial seal with the conduit and a planar seal with the first plate, movement of the conduit causing the first seal device to translate along a planar surface of the first plate, wherein the first seal device maintains the planar seal with the first plate in a first position and a second position of the conduit;
an upper compartment including an electronic component; and
a lower compartment including a fuel-handling component, wherein the vapor barrier is positioned between the upper compartment and the lower compartment, and the conduit extends from the upper compartment to the lower compartment.

16. The fuel dispensing unit of claim 15, wherein the first seal device magnetically couples with the first plate to form the planar seal.

17. The fuel dispensing unit of claim 15, wherein the first seal device has an outer dimension that is greater than the maximum dimension of the first opening.

18. The fuel dispensing unit of claim 15, further comprising a wire extending through the conduit to connect the electronic component to the fuel-handling component.

19. The fuel dispensing unit of claim 15, wherein the seal device couples with only the first plate.

20. The fuel dispensing unit of claim 15, further comprising a second seal device coupling with the second plate.

* * * * *